(12) United States Patent
Dziech

(10) Patent No.: US 10,364,707 B2
(45) Date of Patent: Jul. 30, 2019

(54) RETENTION ASSEMBLY FOR GAS TURBINE ENGINE COMPONENTS

(71) Applicant: General Electric Company, Schenectady, NY (US)

(72) Inventor: Aaron Michael Dziech, Crittenden, KY (US)

(73) Assignee: General Electric Company, Schenectady, NY (US)

( * ) Notice: Subject to any disclaimer, the term of this patent is extended or adjusted under 35 U.S.C. 154(b) by 163 days.

(21) Appl. No.: 15/625,445

(22) Filed: Jun. 16, 2017

(65) Prior Publication Data

US 2018/0363505 A1 Dec. 20, 2018

(51) Int. Cl.
*F01D 25/00* (2006.01)
*F01D 25/24* (2006.01)
*F01D 9/02* (2006.01)
*F01D 9/04* (2006.01)

(52) U.S. Cl.
CPC ............ *F01D 25/246* (2013.01); *F01D 9/02* (2013.01); *F01D 9/042* (2013.01); *F05D 2220/32* (2013.01); *F05D 2240/11* (2013.01); *F05D 2260/30* (2013.01); *F05D 2300/6033* (2013.01)

(58) Field of Classification Search
CPC .......... F01D 25/246; F01D 9/042; F01D 9/09; F05D 2260/30; F05D 2240/11; F05D 2300/6033; F05D 2220/32
See application file for complete search history.

(56) References Cited

U.S. PATENT DOCUMENTS

| 3,558,237 | A | 1/1971 | Wall, Jr. |
| 5,015,540 | A | 5/1991 | Borom et al. |
| 5,330,854 | A | 7/1994 | Singh et al. |
| 5,336,350 | A | 8/1994 | Singh |
| 5,553,999 | A * | 9/1996 | Proctor .................. F01D 11/08 415/134 |
| 5,628,938 | A | 5/1997 | Sangeeta et al. |
| 6,024,898 | A | 2/2000 | Steibel et al. |
| 6,258,737 | B1 | 7/2001 | Steibel et al. |
| 6,403,158 | B1 | 6/2002 | Corman |
| 6,503,441 | B2 | 1/2003 | Corman et al. |
| 7,044,709 | B2 | 5/2006 | Bruce et al. |

(Continued)

*Primary Examiner* — Hieu T Vo
*Assistant Examiner* — Sherman D Manley
(74) *Attorney, Agent, or Firm* — Dority & Manning, P.A.

(57) ABSTRACT

Component retention assemblies and flowpath assemblies are provided. An exemplary retention assembly comprises a flange attached to a support structure, a retention ring received in a flange groove, and an attachment bracket comprising a component of a gas turbine engine. A first segment of the attachment bracket is axially disposed between the flange and a support structure first portion, and a second segment of the attachment bracket is radially disposed between the flange and a support structure second portion. The flange axially loads and the retention ring radially loads the attachment bracket into the support structure. An exemplary flowpath assembly comprises a retention assembly including a flange attached to a casing, a retention ring, and a CMC attachment bracket comprising a plurality of CMC components. The flange axially loads the attachment bracket into an axial stop, and the retention ring radially loads the attachment bracket into the casing.

20 Claims, 6 Drawing Sheets

(56) References Cited

U.S. PATENT DOCUMENTS

| | | | |
|---|---|---|---|
| 8,079,807 B2 | 12/2011 | Shapiro et al. | |
| 8,133,014 B1 | 3/2012 | Ebert et al. | |
| 8,388,307 B2 * | 3/2013 | Smoke | F01D 9/02 |
| | | | 415/134 |
| 9,039,358 B2 | 5/2015 | Tholen et al. | |
| 10,138,750 B2 * | 11/2018 | McCaffrey | F01D 5/02 |
| 2004/0067316 A1 | 4/2004 | Gray et al. | |
| 2009/0208322 A1 * | 8/2009 | McCaffrey | F01D 11/125 |
| | | | 415/113 |
| 2011/0189009 A1 * | 8/2011 | Shapiro | F01D 11/12 |
| | | | 415/209.3 |
| 2013/0017057 A1 * | 1/2013 | Lagueux | F01D 11/08 |
| | | | 415/1 |
| 2013/0113168 A1 * | 5/2013 | Lutjen | F01D 11/005 |
| | | | 277/644 |
| 2016/0003078 A1 * | 1/2016 | Stevens | F01D 11/005 |
| | | | 277/647 |
| 2016/0003080 A1 * | 1/2016 | Mcgarrah | F01D 11/003 |
| | | | 415/173.1 |
| 2016/0186999 A1 | 6/2016 | Freeman et al. | |
| 2016/0290144 A1 | 10/2016 | Roussille et al. | |

\* cited by examiner

RETENTION ASSEMBLY FOR GAS TURBINE ENGINE COMPONENTS

FIELD

The present subject matter relates generally to retention assemblies for gas turbine engine components. More particularly, the present subject matter relates to retention assemblies for ceramic matrix composite gas turbine engine components.

BACKGROUND

More commonly, non-traditional high temperature composite materials, such as ceramic matrix composite (CMC) materials, are being used in applications such as gas turbine engines. Components fabricated from CMC materials have a higher temperature capability compared with typical components, e.g., metal components, which may allow improved component performance and/or increased system temperatures. Generally, gas turbine engines include combustion sections in which compressed air is mixed with a fuel and ignited to generate high pressure, high temperature combustion gases that then flow downstream and expand to drive a turbine section coupled to a compressor section, a fan section, and/or a load device. Components within the gas flow must be adequately restrained to ensure the components remain in their proper location within the flowpath. However, typical attachment methods and assemblies utilize bolted joints, which may overload CMC components, particularly when the CMC components are bolted to non-CMC components such that there is a thermal mismatch between the components.

Accordingly, improved retention assemblies and flowpath assemblies that reduce a thermal strain mismatch between flowpath components and their supporting hardware would be desirable. As an example, a boltless retention assembly for securing CMC components to one or more metallic supporting components would be beneficial.

BRIEF DESCRIPTION

Aspects and advantages of the invention will be set forth in part in the following description, or may be obvious from the description, or may be learned through practice of the invention.

In one exemplary embodiment of the present subject matter, a retention assembly for a component of a gas turbine engine is provided. The retention assembly comprises a flange attached to a support structure of the gas turbine engine, a retention ring received in a groove defined by the flange, and an attachment bracket comprising the component. A first segment of the attachment bracket is axially disposed between the flange and a first portion of the support structure, and a second segment of the attachment bracket is radially disposed between the flange and a second portion of the support structure. The flange axially loads the attachment bracket into the support structure, and the retention ring radially loads the attachment bracket into the support structure.

In another exemplary embodiment of the present subject matter, a retention assembly for a component of a gas turbine engine is provided. The retention assembly comprises a flange having a first member, a second member, and a third member. The first member extends radially, the second member extends axially from the first member, and the third member extends radially from second member. The retention assembly also comprises a retention ring that is received in a groove defined in the second member of the flange and an attachment bracket having a first segment, a second segment, and a third segment. The first segment extends axially, the second segment extends radially from the first segment, and the third segment extends axially from the second segment. The third segment comprises the component of the gas turbine engine. Further, the first segment of the attachment bracket is disposed between the second member of the flange and a support structure of the gas turbine engine, and the retention ring is configured to press the first segment of the attachment bracket into the support structure.

In a further exemplary embodiment of the present subject matter, a flowpath assembly for a gas turbine engine is provided. The flowpath assembly comprises a casing, an annular outer boundary and an annular inner boundary defining a flowpath, a plurality of ceramic matrix composite (CMC) components disposed within the flowpath, and a retention assembly for retaining the plurality of CMC components within the flowpath assembly. The casing circumferentially surrounds the outer boundary and the inner boundary. Moreover, the retention assembly includes a flange attached to the casing, a retention ring received in a groove defined by the flange, and a CMC attachment bracket comprising the plurality of CMC components. A first segment of the attachment bracket is axially disposed between the flange and the casing, and a second segment of the attachment bracket is radially disposed between the flange and an axial stop extending from the casing. The flange axially loads the attachment bracket into the axial stop, and the retention ring radially loads the attachment bracket into the casing.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
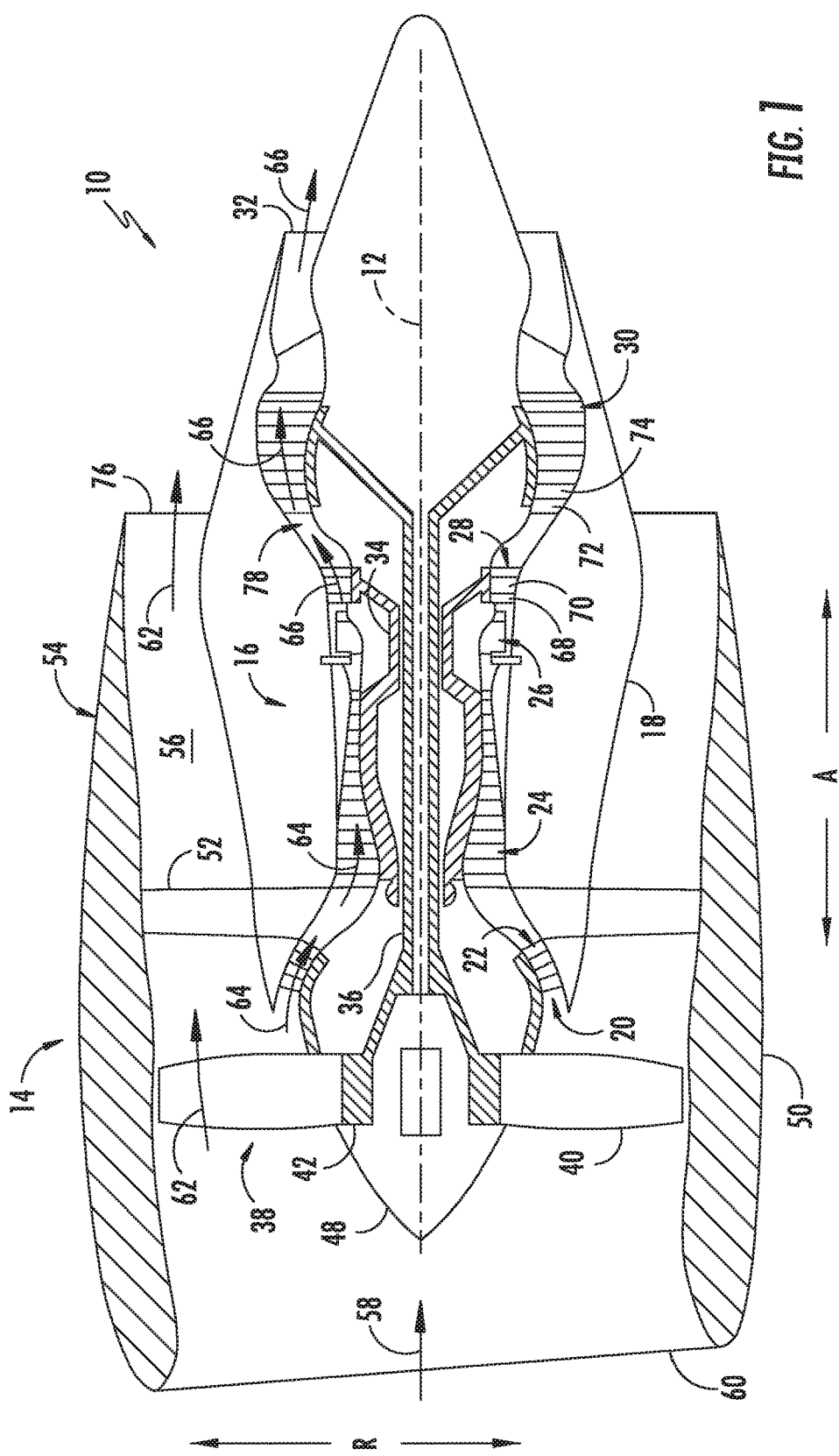
FIG. 1 provides a schematic cross-section view of an exemplary gas turbine engine according to various embodiments of the present subject matter.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first," "second," and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows and "downstream" refers to the direction to which the fluid flows.

Referring now to the drawings, wherein identical numerals indicate the same elements throughout the figures, FIG. 1 is a schematic cross-sectional view of a gas turbine engine in accordance with an exemplary embodiment of the present disclosure. More particularly, for the embodiment of FIG. 1, the gas turbine engine is a high-bypass turbofan jet engine 10, referred to herein as "turbofan engine 10." As shown in FIG. 1, the turbofan engine 10 defines an axial direction A (extending parallel to a longitudinal centerline 12 provided for reference) and a radial direction R. In general, the turbofan 10 includes a fan section 14 and a core turbine engine 16 disposed downstream from the fan section 14.

The exemplary core turbine engine 16 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22. In other embodiments of turbofan engine 10, additional spools may be provided such that engine 10 may be described as a multi-spool engine.

For the depicted embodiment, fan section 14 includes a fan 38 having a plurality of fan blades 40 coupled to a disk 42 in a spaced apart manner. As depicted, fan blades 40 extend outward from disk 42 generally along the radial direction R. The fan blades 40 and disk 42 are together rotatable about the longitudinal axis 12 by LP shaft 36. In some embodiments, a power gear box having a plurality of gears may be included for stepping down the rotational speed of the LP shaft 36 to a more efficient rotational fan speed.

Referring still to the exemplary embodiment of FIG. 1, disk 42 is covered by rotatable front nacelle 48 aerodynamically contoured to promote an airflow through the plurality of fan blades 40. Additionally, the exemplary fan section 14 includes an annular fan casing or outer nacelle 50 that circumferentially surrounds the fan 38 and/or at least a portion of the core turbine engine 16. It should be appreciated that nacelle 50 may be configured to be supported relative to the core turbine engine 16 by a plurality of circumferentially-spaced outlet guide vanes 52. Moreover, a downstream section 54 of the nacelle 50 may extend over an outer portion of the core turbine engine 16 so as to define a bypass airflow passage 56 therebetween.

During operation of the turbofan engine 10, a volume of air 58 enters turbofan 10 through an associated inlet 60 of the nacelle 50 and/or fan section 14. As the volume of air 58 passes across fan blades 40, a first portion of the air 58 as indicated by arrows 62 is directed or routed into the bypass airflow passage 56 and a second portion of the air 58 as indicated by arrows 64 is directed or routed into the LP compressor 22. The ratio between the first portion of air 62 and the second portion of air 64 is commonly known as a bypass ratio. The pressure of the second portion of air 64 is then increased as it is routed through the high pressure (HP) compressor 24 and into the combustion section 26, where it is mixed with fuel and burned to provide combustion gases 66.

The combustion gases 66 are routed through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft or spool 34, thus causing the HP shaft or spool 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft or spool 36, thus causing the LP shaft or spool 36 to rotate, thereby supporting operation of the LP compressor 22 and/or rotation of the fan 38.

The combustion gases 66 are subsequently routed through the jet exhaust nozzle section 32 of the core turbine engine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan 10, also providing propulsive thrust. The HP turbine 28, the LP turbine 30, and the jet exhaust nozzle section 32 at least partially define a hot gas path 78 for routing the combustion gases 66 through the core turbine engine 16.

It will be appreciated that, although described with respect to turbofan 10 having core turbine engine 16, the present subject matter may be applicable to other types of turbomachinery. For example, the present subject matter may be suitable for use with or in turboprops, turboshafts, turbojets, industrial and marine gas turbine engines, and/or auxiliary power units.

Figure 2:
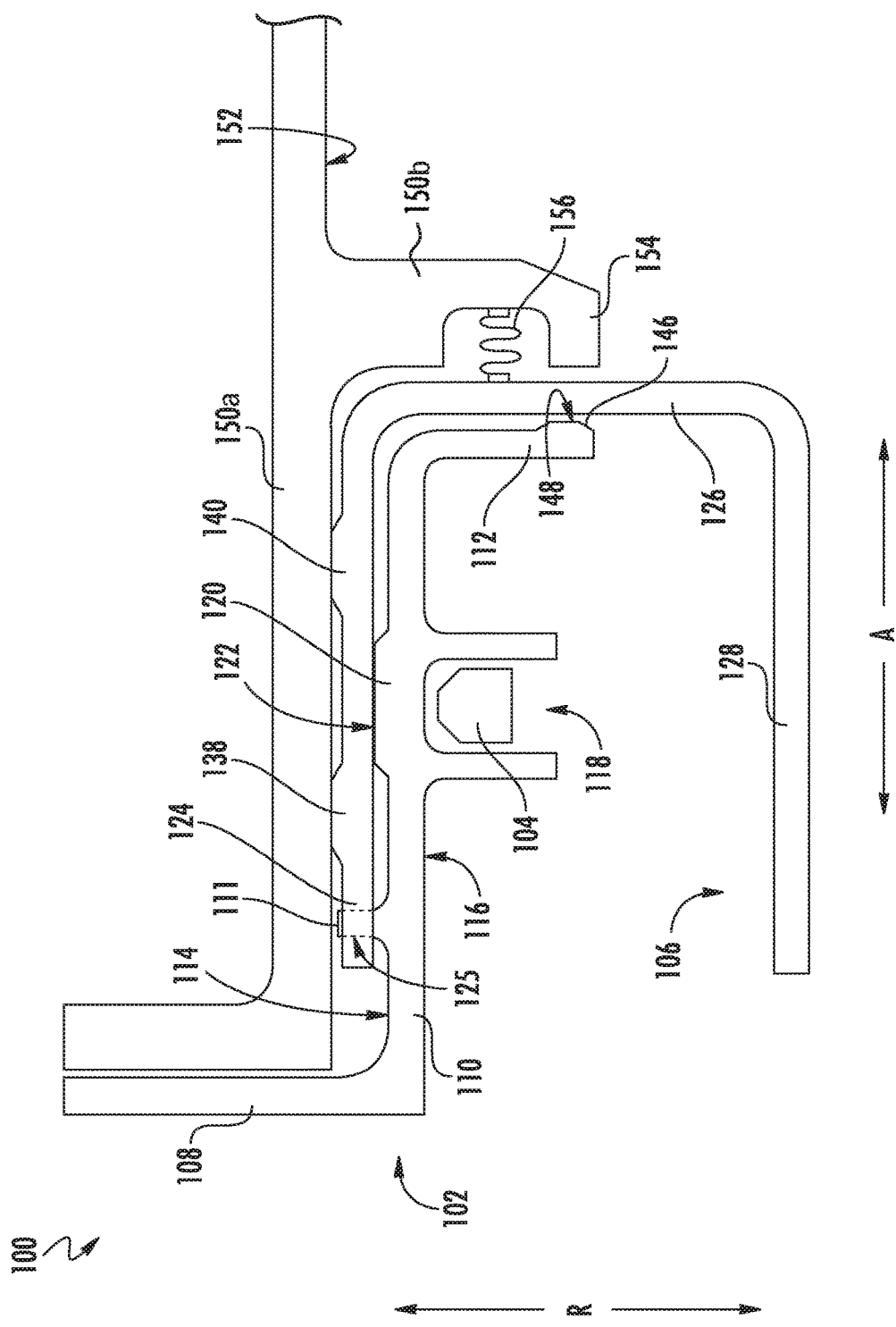
FIG. 2 provides a schematic cross-sectional view of a retention assembly for a gas turbine engine component, according to an exemplary embodiment of the present subject matter.

FIG. 2 provides a schematic cross-sectional view of a retention assembly for a gas turbine engine component, such as a component within the hot gas path 78 of the turbine engine 16, according to an exemplary embodiment of the present subject matter. As shown in FIG. 2, the retention assembly 100 includes a flange 102, a retention ring 104, and an attachment bracket 106. It will be appreciated that each of the flange 102, retention ring 104, and attachment bracket 106 may be generally annular in shape, extending about an annular flowpath through the gas turbine engine. For instance, the annular flange 102, annular retention ring 104, and annular attachment bracket 106 may extend about the hot gas path 78, which extends through the combustor (not shown), HP turbine section 28, LP turbine section 30, and jet exhaust section 32 of the engine 16 as described above. As further illustrated in FIG. 2, the flange 102 secures the attachment bracket 106 against a support structure 150 of the gas turbine engine, restraining the attachment bracket 106 and positively locating the attachment bracket 106 within the flowpath. As described in greater detail herein, the flange 102 axially loads the attachment bracket 106 into a first portion of the support structure 150, while the retention ring 104 radially loads the attachment bracket 106 into a second portion of the support structure 150. Further, the attachment bracket 106 comprises a component, or a plurality of components, of the gas turbine engine, such that the retention assembly 100 secures and locates the component(s) within the flowpath.

In some embodiments, the flange 102 and attachment bracket 106 may be single piece structures extending in a full 360°, generally annular ring about the flowpath. In other embodiments, the flange 102 and attachment bracket 106 each may be formed from a plurality of sections, e.g., a plurality of flange sections 102a, 102b, etc., that are positioned circumferentially adjacent one another to form an annular flange 102 and a plurality of attachment bracket sections 106a, 106b, etc., that are positioned circumferentially adjacent one another to form an annular attachment bracket 106. Preferably, the retention ring 104 is a full 360°, annular split or snap ring, e.g., the retention ring 104 may be a full annular ring with a split or break at one radial location to allow the retention ring 104 to be installed in the retention assembly 100 as described in greater detail herein. However, the retention ring 104 may have other suitable configurations as well.

Continuing with FIG. 2, the flange 102 shown in the exemplary embodiment has a first member 108, a second member 110, and a third member 112. The first member 108 extends generally radially, i.e., generally along the radial direction R, and the second member 110 extends generally axially, i.e., generally along the axial direction A, from the first member 108. The third member 112 extends generally radially from second member 110. As shown in FIG. 2, the first member 108 extends radially outward with respect to the second member 110 while the third member 112 extends radially inward with respect to the second member 110. Further, the second member 110 has a radially outer surface 114 and a radially inner surface 116. A groove 118 is defined by the second member 110; the groove 118 extends from the radially inner surface 116 of the second member 110. As depicted in FIG. 2, the retention ring 104 is received in the groove 118. Moreover, the second member 110 defines a first flange protrusion 120 on the radially outer surface 114 opposite the groove 118. The first flange protrusion 120 has a first flange protrusion surface 122, which may be a machined, substantially flat surface. The flange 102 may be formed from a metallic material, such as a metal or metal alloy, or any other suitable material. Further, the flange 102 may be attached or coupled to the support structure 150 such that the flange 102 and support structure 150 support the attachment bracket 106 and the gas turbine engine component. More particularly, the flange 102 may be attached or coupled to the first portion 150a of the support structure 150. The support structure 150, for example, may be a generally axially extending casing of the gas turbine engine and one or more generally radially extending hangers, such as shroud hangers or the like, where the first portion 150a of the support structure 150 is the casing and the second portion 150b of the support structure is the one or more hangers. As another example, the support structure 150 may be a casing of the gas turbine engine having a first portion 150a that extends generally axially and a second portion 150b that extends generally radially. In either embodiment, the first and second portions 150a, 150b of the support structure 150 may be separate or integral structures that together form the support structure 150.

Referring still to FIG. 2, the exemplary attachment bracket 106 has a first segment 124, a second segment 126, and a third segment 128. The first segment 124 extends generally axially, i.e., generally along the axial direction A. The second segment 126 extends generally radially, i.e., generally along the radial direction R, from the first segment 124. The third segment 128 extends generally axially from the second segment 126. More particularly, the third segment 128 extends along the axial direction A generally parallel to the first segment 124, with the second segment 126 extending along the radial direction R from the first segment 124 to the third segment 128.

Figure 3A:
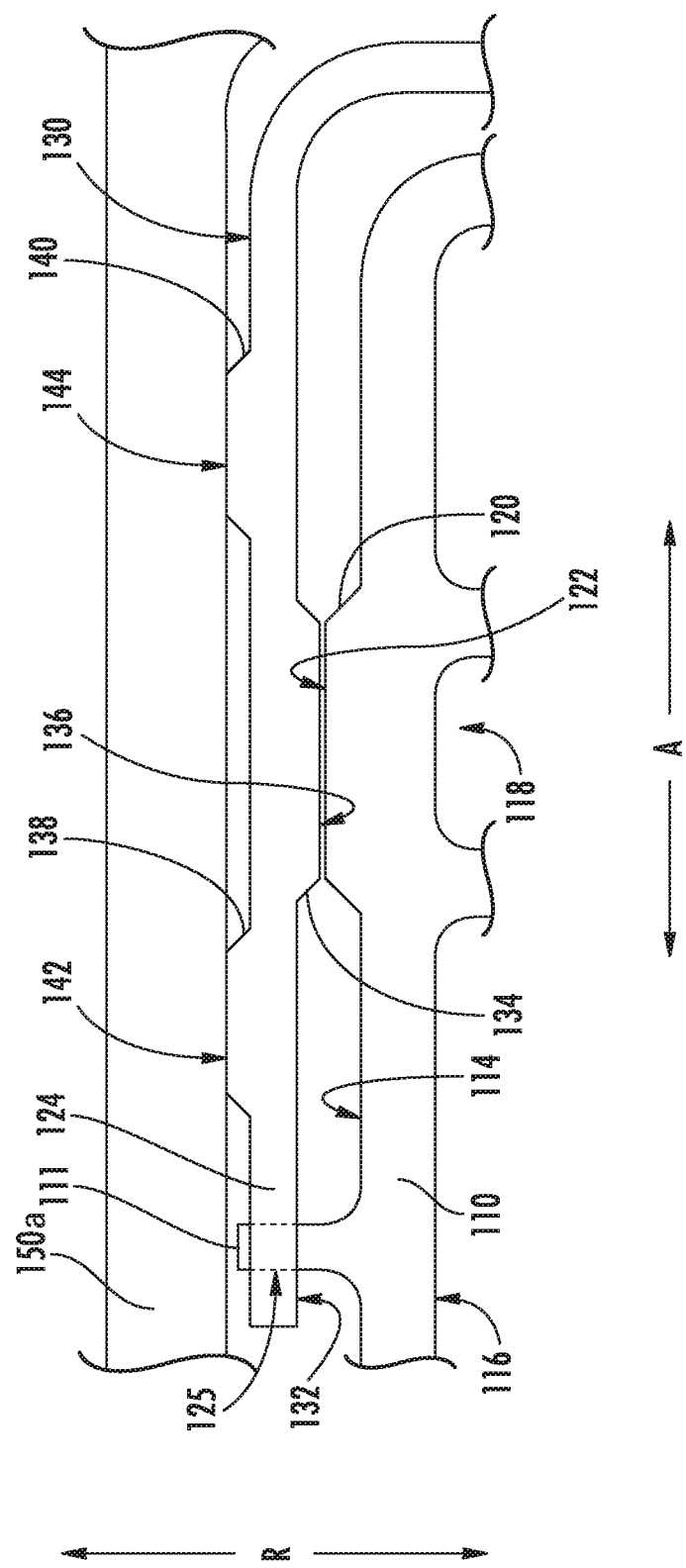
FIG. 3A provides a close-up view of a portion of the retention assembly of FIG. 2.

Turning to FIG. 3A, which provides a close-up view of a portion of the first portion 150a of the support structure 150, the first segment 124 of the attachment bracket 106, and the second member 110 of the flange 102, the attachment bracket 106 defines protrusions similar to the first flange protrusion 120 defined by the flange 102. The first segment 124 of the attachment bracket 106 has a radially outer surface 130 and a radially inner surface 132, and the first segment 124 defines a first bracket protrusion 134 on the radially inner surface 132. The first bracket protrusion 134 has a first bracket protrusion surface 136, which may be a machined, substantially flat surface. Further, the first segment 124 defines a second bracket protrusion 138 and a third bracket protrusion 140 on the radially outer surface 130. The second bracket protrusion 138 has a second bracket protrusion surface 142, and the third bracket protrusion 140 has a third bracket protrusion surface 144. Each of the second bracket protrusion surface 142 and the third bracket protrusion surface 144 may be a machined, substantially flat surface.

More specifically, in particular embodiments, the attachment bracket 106 is formed from a ceramic matrix composite (CMC) material. In such embodiments, each of the first bracket protrusion 134, second bracket protrusion 138, and third bracket protrusion 140 are formed from a buildup of CMC plies, e.g., a CMC ply stack or a plurality of CMC plies laid up with the CMC material forming the attachment bracket 106. Each buildup may be machined to define the respective protrusion 134, 138, 140, as well as the respective protrusion surface 136, 142, 144. That is, each buildup of CMC plies provides machining stock for defining the bracket protrusions 134, 138, 140 and the bracket protrusion surfaces 136, 142, 144.

Referring back to the exemplary embodiment of FIG. 2, the first segment 124 of the attachment bracket 106 is disposed between the second member 110 of the flange 102 and the support structure 150, more specifically, the support structure first portion 150a. As such, the retention ring 104, which is positioned within the groove 118 of the second member 110 as previously described, is configured to press or load the first segment 124 of the attachment bracket 106 into the support structure 150 to thereby hold the attachment bracket 106 between the flange 102 and the support structure 150. Stated differently, the retention ring 104 urges the flange 102 along the radial direction R, which urges first segment 124 of the attachment bracket 106 that is disposed between the flange 102 and the support structure 150 into contact with the support structure 150. In particular embodiments, the retention ring 104 is formed from a metallic material, such as a metal or metal alloy, and thermally expands as the temperature within the gas turbine engine rises. As the retention ring 104 thermally expands, it presses against the flange second member 110, which, in turn, presses against the attachment bracket first segment 124, thereby loading the attachment bracket first segment 124 into the support structure first portion 150a and holding the attachment bracket 106 between the flange 102 and the support structure 150. In some embodiments, such as the exemplary embodiments depicted in FIGS. 4A and 4B, the casing 150 is the outer casing 18 of the core turbine engine 16 illustrated in FIG. 1 and is formed from a metallic material, e.g., a metal or metal alloy.

As depicted in FIG. 2, the first flange protrusion surface 122, which is defined on the first flange protrusion 120 from the radially outer surface 114 of the flange second member 110, interfaces with the first bracket protrusion surface 136, which is defined on the first bracket protrusion 134 from the radially inner surface 132 of the attachment bracket first segment 124. Accordingly, the protrusion surfaces 122, 136 provide interface surfaces for the flange 102 and the attachment bracket 106. In embodiments in which the protrusion surfaces 122, 136 are machined surfaces, the interface between the flange 102 and attachment bracket 106 is a machined interface, which may help transfer the load from the retention ring 104 through the flange 102 and into the attachment bracket 106. Further, as shown most clearly in FIG. 3A, the second and third bracket protrusion surfaces 142, 144, which are defined on the second bracket protrusion 138 and the third bracket protrusion 140, respectively, that protrude from the radially outer surface 130 of the first segment 124, interface with a radially inner surface 152 of the support structure 150. As with the protrusion surfaces 122, 136, the protrusion surfaces 142, 144 provide interface surfaces for the attachment bracket 106 to interface with the support structure 150. In embodiments in which the protrusion surfaces 142, 144 are machined surfaces, the interface between the attachment bracket 106 and the support structure inner surface 152 is a machined interface, which may help load the attachment bracket 106 into the support structure 150.

Figure 3B:
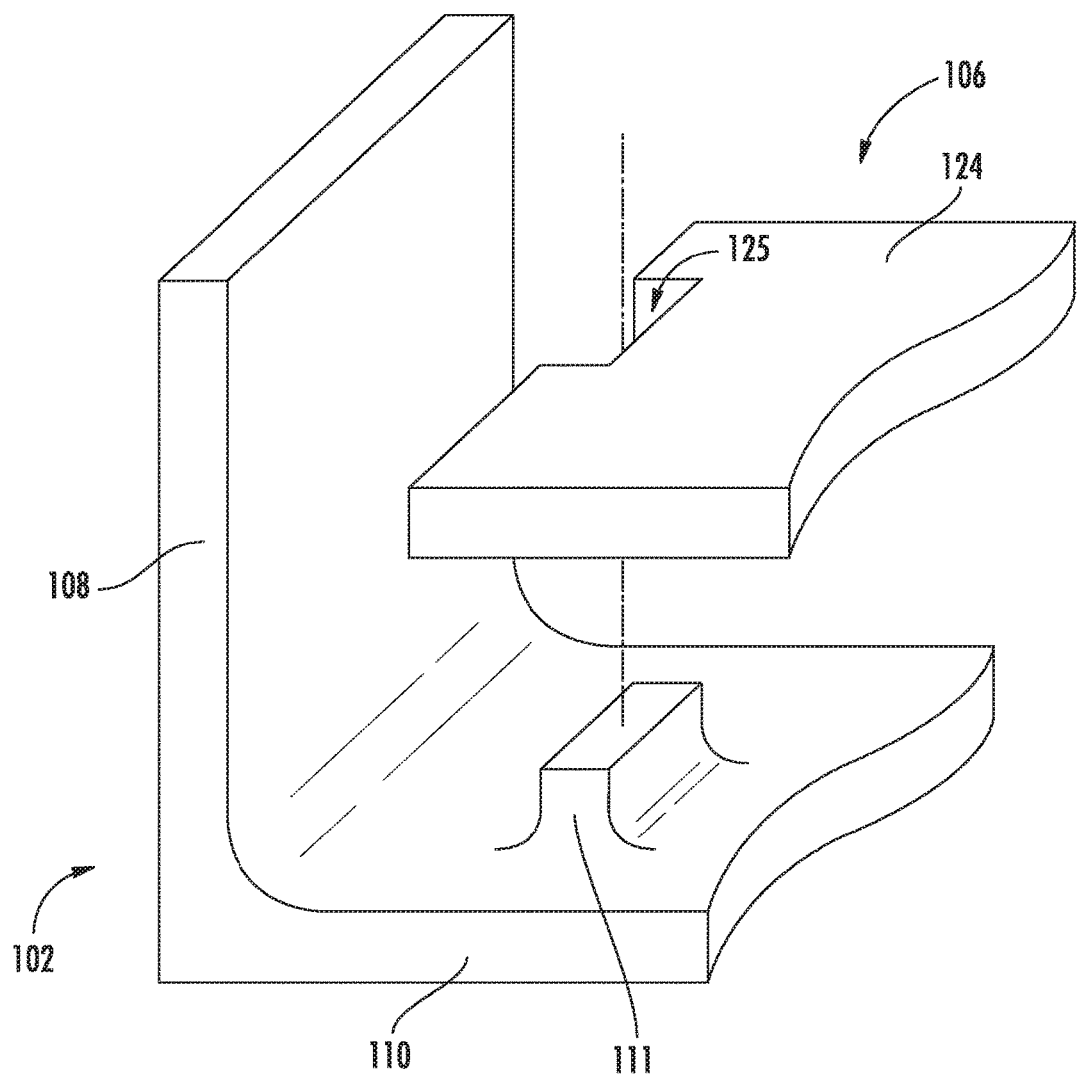
FIG. 3B provides a side, perspective view of a portion of a flange and an attachment bracket of the retention assembly of FIG. 2.

As further illustrated in FIGS. 2, 3A, and 3B, the flange 102 and attachment bracket 106 include an anti-rotation feature that helps hold the attachment bracket 106 in a proper position. More particularly, the flange second member 110 includes a rib 111 that is received within a slot 125 defined in the attachment bracket first segment 124 to help prevent rotation of the attachment bracket 106. As described above, the flange 102 may be formed from a plurality of flange sections and, in such embodiments, each flange section may include a rib 111 that is received in one of a plurality of slots 125 defined in the attachment bracket 106. Similarly, in some embodiments, the attachment bracket 106 may be formed from a plurality of attachment bracket sections, such that each attachment bracket section defines a slot 125 that receives one of a plurality of ribs 111 of the flange 102. In other embodiments, the retention assembly 100 may include a plurality of flange sections and a plurality of attachment bracket sections, and each flange section may include a rib 111 and each attachment bracket section may define a slot 125 such that one of the ribs 111 is received in each slot 125.

Moreover, the third member 112 of the flange 102 is configured to press or urge the second segment 126 of the attachment bracket 106 into the second portion 150b of the support structure 150, which may be, e.g., an axial stop 154 of the support structure 150 that extends radially inward from the support structure inner surface 152. In some embodiments, the flange third member 112 is a spring finger that is preloaded to provide an interference fit between the third member 112, the attachment bracket second segment 126, and the axial stop 154. As shown in FIG. 2, the third member 112 defines a second flange protrusion 146 having a second flange protrusion surface 148, which may be a machined, substantially flat surface. The second flange protrusion 146 interfaces with the second segment 126 of the attachment bracket 106, loading the second segment 126 into the axial stop 154. Further, a seal 156 extends from the second segment 126 of the attachment bracket 106 to the axial stop 154. The seal 156 helps prevent leakage, e.g., of combustion gases 66, into the space between the flange 102 and the support structure 150, in which the attachment bracket 106 is received as illustrated in FIG. 2. The seal 156 may be a W-seal or any other suitable sealing mechanism.

Figure 4A:
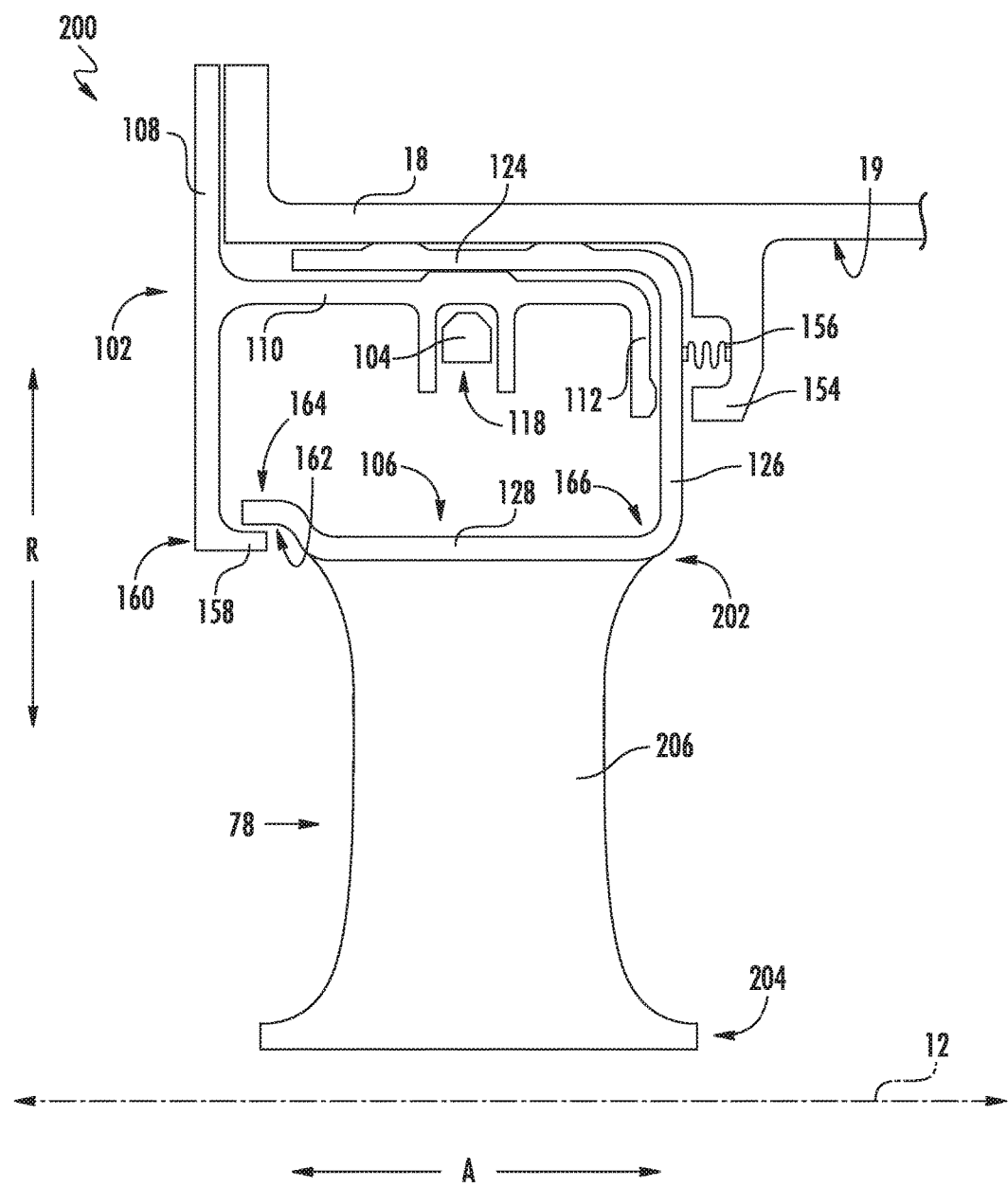
FIG. 4A provides a schematic cross-sectional view of a flowpath assembly for a gas turbine engine, according to an exemplary embodiment of the present subject matter.
Figure 4B:
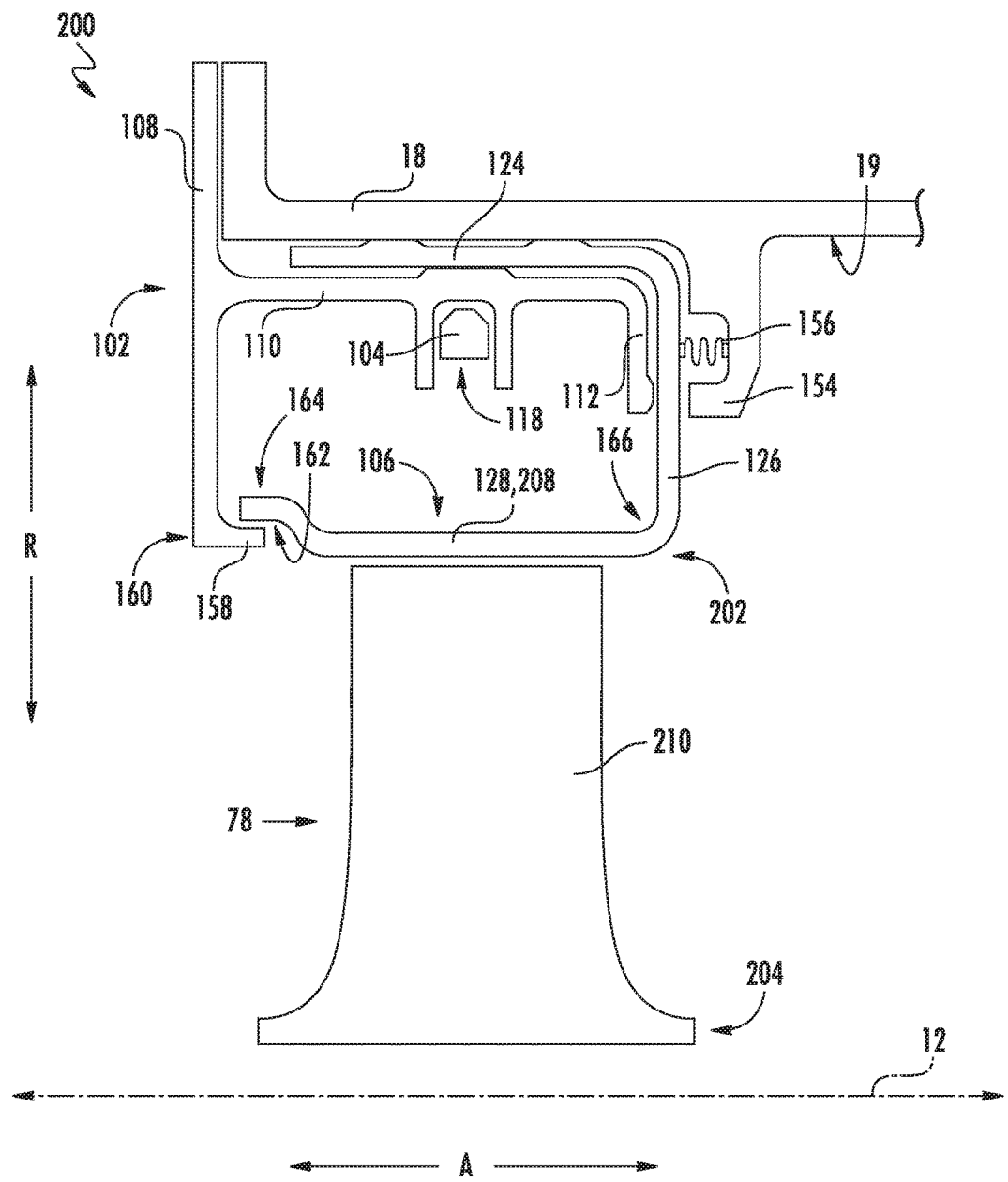
FIG. 4B provides a schematic cross-sectional view of a flowpath assembly for a gas turbine engine, according to another exemplary embodiment of the present subject matter.

Turning now to FIGS. 4A and 4B, schematic cross-sectional views are provided of a flowpath assembly for a gas turbine engine, according to exemplary embodiments of the present subject matter. In the illustrated embodiments, the flowpath is the hot gas path 78 through the HP turbine section 28 of the core turbine engine 16 of FIG. 1. Referring particularly to FIG. 4A, the flowpath assembly 200 includes the outer casing 18 of engine 16, an annular outer boundary 202, and an annular inner boundary 204. The outer and inner boundaries 202, 204 define a flowpath, i.e., the hot gas path 78. The casing 18 circumferentially surrounds the outer boundary 202 and the inner boundary 204.

As shown in FIG. 4A, the flowpath assembly 200 includes a turbine nozzle 206 disposed within the flowpath 78. It will be appreciated that, although not depicted in FIG. 4A, the flowpath assembly 200 comprises a plurality of turbine nozzles 206, which are circumferentially spaced apart from one another about the axial centerline 12 to form an annular array of nozzles 206 disposed within the flowpath 78. Each turbine nozzle 206 extends from the outer flowpath boundary 202 to the inner flowpath boundary 204. Thus, with respect to the turbine nozzles 206, the outer boundary 202 is defined by an outer band of the nozzles, and the inner boundary is defined by an inner band of the nozzles.

In the exemplary embodiment, each turbine nozzle 206 is formed from a ceramic matrix composite (CMC) material, such that a plurality of CMC components is disposed within the flowpath 78. As further illustrated in FIG. 4A, the retention assembly 100 described above may be used to secure the plurality of turbine nozzles 206 to the casing 18 such that the nozzles 206 are secured within the flowpath assembly 200. In particular, the attachment bracket 106 of the retention assembly 100 comprises the turbine nozzles 206, such that the securing of the attachment bracket 106 between the flange 102 and the casing 18 secures the turbine nozzles 206 within the flowpath assembly 200. In some embodiments, the turbine nozzles 206 are attached or coupled to the attachment bracket 106; in other embodiments, the turbine nozzles 206 are integrally formed with the attachment bracket 206.

As previously described, the attachment bracket 106 may be formed from a plurality of attachment bracket sections. Each attachment bracket section 106a, 106b, etc. of the plurality of attachment bracket sections may comprise at least one turbine nozzle 206. In some embodiments, the number of attachment bracket sections is equal to the number of turbine nozzles 206, i.e., one attachment bracket sections is used to secure one turbine nozzle 206. In other embodiments, one attachment bracket section comprises more than one turbine nozzle 206, e.g., two, three, or more nozzles 206, such that one attachment bracket section secures more than one turbine nozzle 206 within the flowpath assembly 200.

In the exemplary embodiment depicted in FIG. 4A, the first member 108 of the flange 102 of the retention assembly 100 comprises a foot 158 that extends axially from a first end 160 of the first member 108. More particularly, the foot 158 extends axially toward the third segment 128 of the attachment bracket 106, and the third segment 128 defines a recess 162 at a first end 164 of the third segment 128 and the foot 158 is received in the recess 162. The interface between the foot 158 of the flange 102 and the recess 162 of the attachment bracket 106 helps reduce bending moments and/or other forces on the turbine nozzles 206 and attachment bracket 106 that, e.g., may otherwise induce a stress concentration at the intersection of a second end 166 of the third segment 128 and the second segment 126.

FIG. 4B illustrates another exemplary embodiment of the flowpath assembly 200. The embodiment of FIG. 4B is substantially similar to the exemplary embodiment of FIG. 4A, except that the gas turbine component secured by the retention assembly 100 is an annular shroud 208, rather than a turbine nozzle 206, that is disposed radially outward of a plurality of turbine rotor blades 210, thereby defining the outer boundary 202 of the flowpath assembly 200. More specifically, in the exemplary embodiment of FIG. 4B, the attachment bracket 106 of the retention assembly 100 comprises the shroud 208. As illustrated, the third segment 128 of the attachment bracket 106 is the shroud 208. In some embodiments, the shroud 208 may be formed from a plurality of shroud sections, and each shroud section is formed by the third segment 128 of an attachment bracket section such that together, the plurality of attachment bracket sections form the annular shroud 208. In embodiments in which the attachment bracket 106 is formed from a CMC material, the shroud 208 is a CMC shroud and is integrally formed with the attachment bracket 106, whether the attachment bracket 106 is a single piece annular structure or formed from a plurality of attachment bracket sections.

As described herein, the attachment bracket 106, turbine nozzles 206, and shroud 208 may be formed from a ceramic matrix composite (CMC) material, which is a non-metallic material having high temperature capability. It may be particularly useful to utilize CMC materials due to the relatively high temperatures of the combustion gases 66, and the use of CMC materials within the flowpath assembly 200 may allow reduced cooling airflow to the CMC components and higher combustion temperatures, as well as other benefits and advantages. However, other components of the turbofan engine 10, such as components of HP compressor 24, HP turbine 28, and/or LP turbine 30, also may comprise a CMC material.

In some embodiments, the turbine nozzles 206 may be integrally formed with the attachment bracket 106 from a CMC material, or one or more turbine nozzles 206 may be integrally formed with an attachment bracket section from a CMC material. In other embodiments, the attachment bracket 106 comprises the shroud 208, such that the shroud 208 is integrally formed from a CMC material as part of the attachment bracket 106. In still other embodiments, the flowpath assembly comprises a plurality of shroud sections that together form the shroud 208, and each shroud section is integrally formed from a CMC material as part of an attachment bracket section.

Exemplary CMC materials utilized for such components may include silicon carbide (SiC), silicon, silica, or alumina matrix materials and combinations thereof. Ceramic fibers may be embedded within the matrix, such as oxidation stable reinforcing fibers including monofilaments like sapphire and silicon carbide (e.g., Textron's SCS-6), as well as rovings and yarn including silicon carbide (e.g., Nippon Carbon's NICALON®, Ube Industries' TYRANNO®, and Dow Corning's SYLRAMIC®), alumina silicates (e.g., Nextel's 440 and 480), and chopped whiskers and fibers (e.g., Nextel's 440 and SAFFIL®), and optionally ceramic particles (e.g., oxides of Si, Al, Zr, Y, and combinations thereof) and inorganic fillers (e.g., pyrophyllite, wollastonite, mica, talc, kyanite, and montmorillonite). For example, in certain embodiments, bundles of the fibers, which may include a ceramic refractory material coating, are formed as a reinforced tape, such as a unidirectional reinforced tape. A plurality of the tapes may be laid up together (e.g., as plies) to form a preform component. The bundles of fibers may be impregnated with a slurry composition prior to forming the preform or after formation of the preform. The preform may then undergo thermal processing, such as a cure or burn-out to yield a high char residue in the preform, and subsequent chemical processing, such as melt-infiltration or chemical vapor infiltration with silicon, to arrive at a component formed of a CMC material having a desired chemical composition. In other embodiments, the CMC material may be formed as, e.g., a carbon fiber cloth rather than as a tape.

More specifically, examples of CMC materials, and particularly SiC/Si—SiC (fiber/matrix) continuous fiber-reinforced ceramic composite (CFCC) materials and processes, are described in U.S. Pat. Nos. 5,015,540; 5,330,854; 5,336,350; 5,628,938; 6,024,898; 6,258,737; 6,403,158; and 6,503,441, and U.S. Patent Application Publication No. 2004/0067316. Such processes generally entail the fabrication of CMCs using multiple pre-impregnated (prepreg) layers, e.g., the ply material may include prepreg material consisting of ceramic fibers, woven or braided ceramic fiber cloth, or stacked ceramic fiber tows that has been impregnated with matrix material. In some embodiments, each prepreg layer is in the form of a "tape" comprising the desired ceramic fiber reinforcement material, one or more precursors of the CMC matrix material, and organic resin binders. Prepreg tapes can be formed by impregnating the reinforcement material with a slurry that contains the ceramic precursor(s) and binders. Preferred materials for the precursor will depend on the particular composition desired for the ceramic matrix of the CMC component, for example, SiC powder and/or one or more carbon-containing materials if the desired matrix material is SiC. Notable carbon-containing materials include carbon black, phenolic resins, and furanic resins, including furfuryl alcohol ($C_4H_3OCH_2OH$). Other typical slurry ingredients include organic binders (for example, polyvinyl butyral (PVB)) that promote the flexibility of prepreg tapes, and solvents for the binders (for example, toluene and/or methyl isobutyl ketone (MIBK)) that promote the fluidity of the slurry to enable impregnation of the fiber reinforcement material. The slurry may further contain one or more particulate fillers intended to be present in the ceramic matrix of the CMC component, for example, silicon and/or SiC powders in the case of a Si—SiC matrix. Chopped fibers or whiskers or other materials also may be embedded within the matrix as previously described. Other compositions and processes for producing composite articles, and more specifically, other slurry and prepreg tape compositions, may be used as well, such as, e.g., the processes and compositions described in U.S. Patent Application Publication No. 2013/0157037.

The resulting prepreg tape may be laid-up with other tapes, such that a CMC component formed from the tape comprises multiple laminae, each lamina derived from an individual prepreg tape. Each lamina contains a ceramic fiber reinforcement material encased in a ceramic matrix formed, wholly or in part, by conversion of a ceramic matrix precursor, e.g., during firing and densification cycles as described more fully below. In some embodiments, the reinforcement material is in the form of unidirectional arrays of tows, each tow containing continuous fibers or filaments. Alternatives to unidirectional arrays of tows may be used as well. Further, suitable fiber diameters, tow diameters, and center-to-center tow spacing will depend on the particular application, the thicknesses of the particular lamina and the tape from which it was formed, and other factors. As described above, other prepreg materials or non-prepreg materials may be used as well.

After laying up the tapes or plies to form a layup, the layup is debulked and, if appropriate, cured while subjected to elevated pressures and temperatures to produce a preform. The preform is then heated (fired) in a vacuum or inert atmosphere to decompose the binders, remove the solvents, and convert the precursor to the desired ceramic matrix material. Due to decomposition of the binders, the result is a porous CMC body that may undergo densification, e.g., melt infiltration (MI), to fill the porosity and yield the CMC component. Specific processing techniques and parameters for the above process will depend on the particular composition of the materials. For example, silicon CMC components may be formed from fibrous material that is infiltrated with molten silicon, e.g., through a process typically referred to as the Silcomp process. Another technique of manufacturing CMC components is the method known as the slurry cast melt infiltration (MI) process. In one method of manufacturing using the slurry cast MI method, CMCs are produced by initially providing plies of balanced two-dimensional (2D) woven cloth comprising silicon carbide (SiC)-containing fibers, having two weave directions at substantially 90° angles to each other, with substantially the same number of fibers running in both directions of the weave. The term "silicon carbide-containing fiber" refers to a fiber having a composition that includes silicon carbide, and preferably is substantially silicon carbide. For instance, the fiber may have a silicon carbide core surrounded with carbon, or in the reverse, the fiber may have a carbon core surrounded by or encapsulated with silicon carbide.

Other techniques for forming CMC components include polymer infiltration and pyrolysis (PIP) and oxide/oxide processes. In PIP processes, silicon carbide fiber preforms are infiltrated with a preceramic polymer, such as polysilazane and then heat treated to form a SiC matrix. In oxide/oxide processing, aluminum or alumino-silicate fibers may be pre-impregnated and then laminated into a preselected geometry. Components may also be fabricated from a carbon fiber reinforced silicon carbide matrix (C/SiC) CMC. The C/SiC processing includes a carbon fibrous preform laid up on a tool in the preselected geometry. As utilized in the slurry cast method for SiC/SiC, the tool is made up of graphite material. The fibrous preform is supported by the tooling during a chemical vapor infiltration process at about 1200° C., whereby the C/SiC CMC component is formed. In still other embodiments, 2D, 2.5D, and/or 3D preforms may be utilized in MI, CVI, PIP, or other processes. For example, cut layers of 2D woven fabrics may be stacked in alternating weave directions as described above, or filaments may be wound or braided and combined with 3D weaving, stitching, or needling to form 2.5D or 3D preforms having multiaxial fiber architectures. Other ways of forming 2.5D or 3D preforms, e.g., using other weaving or braiding methods or utilizing 2D fabrics, may be used as well.

Thus, a variety of processes may be used to form CMC gas turbine components, such as a CMC attachment bracket 106, a CMC turbine nozzle 206, and a CMC shroud 208. Of course, other suitable processes, including variations and/or combinations of any of the processes described above, also may be used to form CMC components for use with the various retention assembly and flowpath assembly embodiments described herein.

As described herein, the present subject matter provides a boltless retention assembly for securing gas turbine components within a gas turbine engine. In particular, the present subject matter provides a boltless retention assembly for securing CMC components within a flowpath assembly of a gas turbine engine. Using the subject matter described herein, the CMC components, such as the CMC turbine nozzle 206 and the CMC shroud 208, may be secured to or with metallic supporting hardware without overloading the CMC components, e.g., due to thermal strain mismatch between the CMC and metallic components. More specifically, the present subject matter describes a retention assembly 100 that utilizes a case mounted flange 102 having a member 112 that axially loads an attachment bracket 106, which comprises a CMC component positioned within the flowpath defined by the flowpath assembly, into the case 150. The exemplary retention assemblies 100 described herein also utilize a retention ring 104 that provides a thermally activated radial loading mechanism. As such, the flange 102 and retention ring 104 axially and radially secure and locate the attachment bracket 106, thereby securing and positively locating the CMC component (or plurality of CMC components) attached to or formed with the attachment bracket 106 without the use of bolted joints or the like. Other benefits and advantages also may be realized from the present subject matter.

This written description uses examples to disclose the invention, including the best mode, and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they include structural elements that do not differ from the literal language of the claims or if they include equivalent structural elements with insubstantial differences from the literal language of the claims.

What is claimed is:

1. A retention assembly for a component of a gas turbine engine, comprising:
 a flange attached to a support structure of the gas turbine engine;
 a retention ring received in a groove defined by the flange; and
 an attachment bracket comprising the component, a first segment of the attachment bracket axially disposed between the flange and a first portion of the support structure, a second segment of the attachment bracket radially disposed between the flange and a second portion of the support structure,
 wherein the flange axially loads the attachment bracket into the support structure, and
 wherein the retention ring radially loads the attachment bracket into the support structure.

2. The retention assembly of claim 1, wherein the attachment bracket and the component of the gas turbine engine are formed from a ceramic matrix composite material, and wherein the retention ring is formed from a metallic material.

3. The retention assembly of claim 1, wherein the flange comprises a plurality of flange sections, and wherein the attachment bracket comprises a plurality of attachment bracket sections.

4. The retention assembly of claim 3, further comprising:
a plurality of components of the gas turbine engine,
wherein each of the plurality of attachment bracket sections comprises at least one of the plurality of components.

5. The retention assembly of claim 1, wherein the component is a turbine nozzle.

6. The retention assembly of claim 1, wherein the component is a shroud.

7. A retention assembly for a component of a gas turbine engine, comprising:
a flange having a first member, a second member, and a third member, the first member extending radially, the second member extending axially from the first member, the third member extending radially from second member;
a retention ring, the retention ring received in a groove defined in the second member of the flange; and
an attachment bracket having a first segment, a second segment, and a third segment, the first segment extending axially, the second segment extending radially from the first segment, the third segment extending axially from the second segment, the third segment comprising the component,
wherein the first segment of the attachment bracket is disposed between the second member of the flange and a support structure of the gas turbine engine, and
wherein the retention ring is configured to press the first segment of the attachment bracket into the support structure.

8. The retention assembly of claim 7, wherein the attachment bracket is formed from a ceramic matrix composite (CMC) material.

9. The retention assembly of claim 8, wherein the component is a CMC turbine nozzle, and wherein the CMC turbine nozzle extends from the third segment of the attachment bracket.

10. The retention assembly of claim 8, wherein the component is a CMC shroud, and wherein the third segment of the attachment bracket forms the CMC shroud.

11. The retention assembly of claim 7, wherein the second member of the flange defines a flange protrusion on a radially outer surface opposite the groove, the flange protrusion having a flange protrusion surface, wherein the first segment of the attachment bracket defines a first bracket protrusion on a radially inner surface, the first bracket protrusion having a first bracket protrusion surface, and wherein the flange protrusion surface interfaces with the first bracket protrusion surface.

12. The retention assembly of claim 7, wherein the first segment of the attachment bracket defines on a radially outer surface a second bracket protrusion and a third bracket protrusion, the second bracket protrusion having a second bracket protrusion surface, the third bracket protrusion having a third bracket protrusion surface, and wherein the second and third bracket protrusion surfaces interface with a radially inner surface of the support structure.

13. The retention assembly of claim 7, wherein the third member of the flange is configured to press the second segment of the attachment bracket into an axial stop of the support structure.

14. The retention assembly of claim 13, wherein a seal extends from the second segment of the attachment bracket to the axial stop.

15. The retention assembly of claim 7, wherein the first member of the flange comprises a foot extending axially from a first end of the first member, wherein the third segment of the attachment bracket defines a recess at a first end of the third segment, and wherein the foot is received in the recess.

16. A flowpath assembly for a gas turbine engine, comprising:
a casing;
an annular outer boundary and an annular inner boundary defining a flowpath, the casing circumferentially surrounding the outer boundary and the inner boundary;
a plurality of ceramic matrix composite (CMC) components disposed within the flowpath; and
a retention assembly for retaining the plurality of CMC components within the flowpath assembly, the retention assembly including
a flange attached to the casing,
a retention ring received in a groove defined by the flange, and
a CMC attachment bracket comprising the plurality of CMC components, a first segment of the attachment bracket axially disposed between the flange and the casing, a second segment of the attachment bracket radially disposed between the flange and an axial stop extending from the casing,
wherein the flange axially loads the attachment bracket into the axial stop, and
wherein the retention ring radially loads the attachment bracket into the casing.

17. The flowpath assembly of claim 16, wherein a seal extends from the attachment bracket to the axial stop.

18. The flowpath assembly of claim 16, wherein the casing, the flange, and the retention ring each are formed from a metallic material.

19. The flowpath assembly of claim 16, wherein the flange is a single piece, annular structure.

20. The flowpath assembly of claim 16, wherein the attachment bracket is a single piece, annular structure.

* * * * *